United States Patent [19]

Yang

[11] Patent Number: 5,429,345

[45] Date of Patent: Jul. 4, 1995

[54] ROTARY DISC POSITIONER WITH AXIAL DISPLACEMENT

[76] Inventor: Tai-Her Yang, 5-1 Taipin St., Si-Hu Town, Dzan-Hwa, Taiwan

[21] Appl. No.: 67,944

[22] Filed: May 27, 1993

[51] Int. Cl.$^6$ .............................. B23Q 1/04; B25B 1/22
[52] U.S. Cl. ....................................................... 269/71
[58] Field of Search ..................................... 269/71, 73

[56] References Cited

U.S. PATENT DOCUMENTS

| | | | |
|---|---|---|---|
| 510,648 | 12/1893 | Moore | 269/71 |
| 2,538,640 | 1/1951 | Click | 269/71 |
| 3,993,297 | 11/1976 | Tokunaga | 269/71 X |
| 4,014,439 | 3/1977 | Kocksiek et al. | 269/71 X |
| 5,110,098 | 5/1992 | Merjanian | 269/71 X |

FOREIGN PATENT DOCUMENTS 2815677 11/1978 Germany ................................ 269/73

Primary Examiner—John E. Ryznic
Attorney, Agent, or Firm—Bacon & Thomas

[57] ABSTRACT

A positioning arrangement for a cutting machine includes a first gear rotatable about a first axis and a second gear rotatable about a second axis, said second gear being mounted on a spindle which is affixed to the first gear, and the axes being displaced from each other to form an eccentric drive mechanism. In a variation of this eccentric drive mechanism, the spindle for the second gear may be mounted on a linear drive mechanism for displacing the central axis of the second gear relative to the central axis of the first gear.

2 Claims, 2 Drawing Sheets

ROTARY DISC POSITIONER WITH AXIAL DISPLACEMENT

SUMMARY OF THE INVENTION

The means and structure of coordinates displacement drive formed by multi-arbor overlaying double-angle displacement relates to at least two-layer overlaying structure for individual angle displacement driving against different axial centers to allow the uppermost layer target point for random absolute positoning displacement on the work surface or for gyration driving along any of axial centers.

DETAILED DESCRIPTION OF THE INVENTION

The present invention is described in company with accompaying drawings below.

Figure 1:
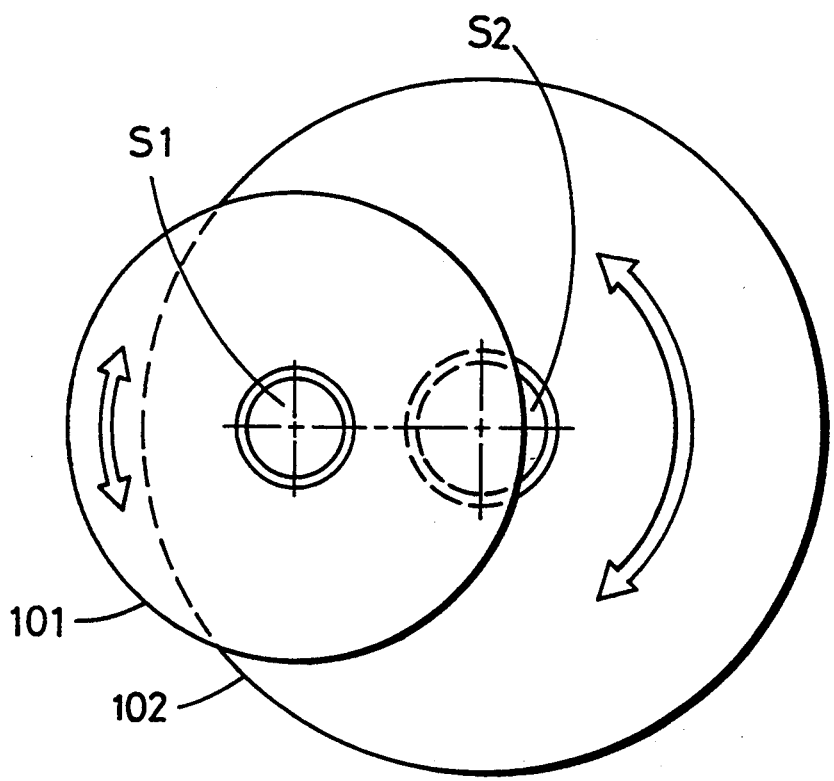
FIG. 1 is a diagramatic view showing the basic structure of the present means and structure of coordinates displacement drive formed by multi-arbor overlaying double-angle displacement.
Figure 2:
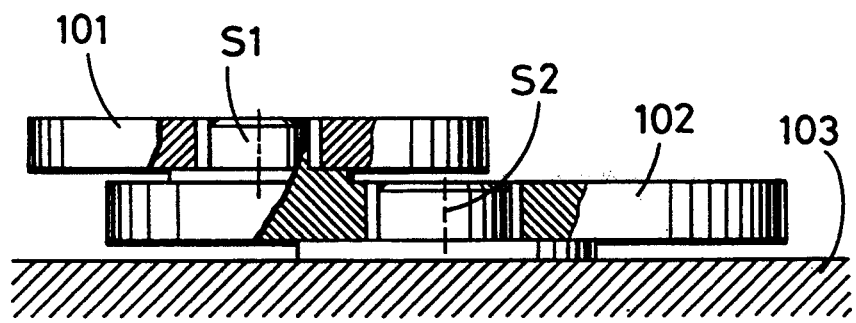
FIG. 2 is a side view of FIG. 1.

Referring to FIG. 1, a diagramatic view showing the basic structure of the present means and structure of coordinates displacement drive formed by multi-arbor overlaying double-angle displacement, and FIG. 2 is a side view of FIG. 1, comprising:

a first gyration seat 101: for loading workpiece or itself as the bearing seat of the mechanism or machine body structure, which can rotate along S1 axial center, and the base is an independent structure secured to the second gyration seat or directly formed by the second gyration seat;

a second gyration seat 102: except for loading the first gyration seat, it may rotate along S2 axial center for driving the base 103, and S2 and S1 are different axis and axial distance is smaller than the radius of the first gyration seat.

The foregoing structure can be driven respectively or jointly by the first gyration seat and the second gyration seat to make the target point on the first gyration seat as the coordinates position adjustment driving on the work surface; the foregoing structure includes the conventional work table bearing seat, guide rail bearing and transmission structure, arrangement angle displacement detection device, fastening device, manual or mechanical power driving structure.

The present means and structure of coordinates displacement drive formed by multi-arbor overlaying double-angle displacement as shown in FIG. 1, may further be designed into linear displacement driving adjustment structure and function between two axial centers, and the linear displacement driving may be engaged in synthetical vector displacement adjustment together with one or all of the foregoing two gyration drivings so as to change the absolute position on the uppermost layer first gyration seat, and its function includes:

(1) to change double-polar coordinates position decomposition by adjusting axial distance between S1 and S2.

(2) to turn S2 as driving direction for adjustable linear displacement mechanism.

(3) linear displacement mechanism and S1 or S2 rotational axis for synthetical driving displacement.

Figure 3:
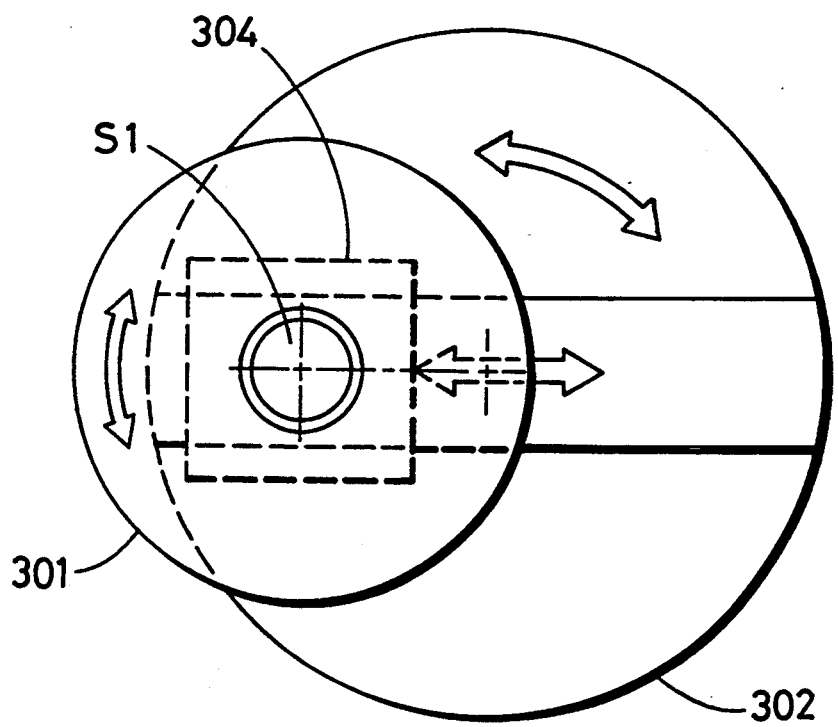
FIG. 3 a diagramatic view showing the basic structure of the present means and structure of coordinates displacement drive formed by multi-arbor overlaying double-angle displacement which can be engaged in linear displacement driving adjustment between two axial centers.
Figure 4:
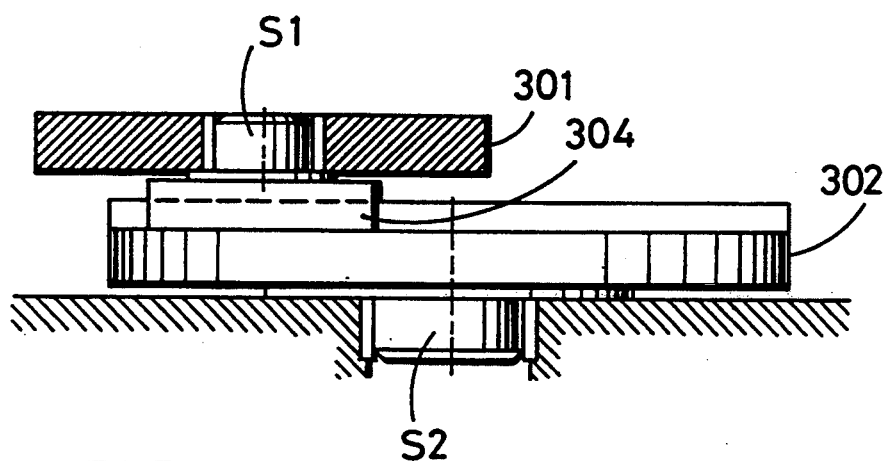
FIG. 4 is a side view of FIG. 3.

FIG. 3 a diagramatic view showing the basic structure of the present means and structure of coordinates displacement drive formed by multi-arbor overlaying double-angle displacement which can be engaged in linear displacement driving adjustment between two axial centers and FIG. 4 is a side view of FIG. 3, comprising:

the first gyration seat 301 for loading workpiece or itself as the bearing seat of the mechanism or machine body structure, which can rotate along S1 axial center, and a linear displacement mechanism 304 is mounted under the base and between with the second gyration seat 302 for counterly passing by the axial centers S1 and S2, and the mechanism includes coupling guide rails, guide slot or dove-tail slot and dove-tail seat or guide lever and slide block, and having guide worm or ball-roller worm or other linear displacement driving device for accepting manual or mechanical or electric power or magnetic or fluid driving in order to adjust the axial distance between S1 and S2 for independent driving or synthetical driving together with the first gyration seat, or synthetical driving together with the second gyration seat or synthetical driving in combination of three, so as to move the target point on the first gyration seat for absolute position driving and positioning displacement.

The foregoing gyration displacement and linear displacement may be manual control positioning or digital control system driving related interface for positioning or analogical control system for positioning or for independent driving or system integration for positioning drive, fastening and display and for cutting press delivery.

I claim:

1. A drive mechanism for positioning an object, comprising:

a first disc rotatable about a central axis;

a second disc and means for mounting the second disc on the first disc such that the second disc is rotatable about a central axis which is displaced from the central axis of the first disc to form an eccentric drive mechanism, whereby a target point on the second disc may be positioned anywhere in a two dimensional coordinate system by selectively rotating said first and second discs, and further comprising means including a groove in the first disc for permitting linear displacement of the second disc relative to the first disc.

2. Apparatus as claimed in claim 1, wherein said second disc is for mounting a cutting tool or workpiece to be cut.

* * * * *

UNITED STATES PATENT AND TRADEMARK OFFICE
CERTIFICATE OF CORRECTION

PATENT NO. : 5,429,345

DATED : July 4, 1995

INVENTOR(S) : Tai-Her Yang

It is certified that error appears in the above-identified patent and that said Letters Patent is hereby corrected as shown below:

Title page, item [54] should read as follows: --COORDINATE DISPLACEMENT DRIVE FORMED BY A MULTI-SPINDLE OVERLAPPING-ANGLE DISPLACEMENT MECHANISM--.

Column 1, lines 2-65 and column 2, lines 1-45, should be deleted to be substituted with the substitute Specification as shown on the attached pages.

UNITED STATES PATENT AND TRADEMARK OFFICE
CERTIFICATE OF CORRECTION

PATENT NO. : 5,429,345

DATED : July 4, 1995

INVENTOR(S) : Tai-Her Yang

It is certified that error appears in the above-identified patent and that said Letters Patent is hereby corrected as shown below:

COORDINATE DISPLACEMENT DRIVE FORMED BY A MULTI-SPINDLE OVERLAPPING-ANGLE DISPLACEMENT MECHANISM

SUMMARY OF THE INVENTION

A driving mechanism for positioning a target includes discs rotatable about different axial centers, with an upper disc being eccentrically supported by a lower disc, to allow random absolute positioning on a work surface or for eccentric rotation of either disc about either of the axial centers.

BRIEF DESCRIPTION OF THE DRAWINGS

FIG. 1 is a plan view showing the basic structure of a coordinate displacement drive of a preferred embodiment of the invention.

FIG. 2 is a side view of the drive of FIG. 1

FIG. 3 is a plan view showing the basic structure of a coordinate displacement drive an additional linear displacement mechanism according to a second preferred embodiment of the invention.

FIG. 4 is a side view of the drive of FIG. 3.

UNITED STATES PATENT AND TRADEMARK OFFICE
CERTIFICATE OF CORRECTION

PATENT NO. : 5,429,345

DATED : July 4, 1995

INVENTOR(S) : Tai-Her Yang

It is certified that error appears in the above-identified patent and that said Letters Patent is hereby corrected as shown below:

DETAILED DESCRIPTION OF THE INVENTION

Referring to FIG. 1, a coordinate displacement according to a first preferred embodiment of the invention includes a first disc 101 for supporting a workpiece or for serving as the bearing seat of a mechanism or machine body structure. Disc 101 rotates about a central axis S1, and the base is an independent structure secured to a second disc 102 or is integrally formed with the second disc. Disc 102 rotates about a central axis S2 affixed to base 103. Central axes S2 and S1 are separated by a distance which is smaller than the radius of the first disc.

The foregoing structure can be driven respectively or jointly by the first disc and the second disc to adjust the coordinate position of a target point on the first disc S101 relative to work surface, and includes a conventional work table bearing seat, guide rail bearing and transmission structure, angle displacement detection device, and mounting device, and manual or mechanical power driving structure.

UNITED STATES PATENT AND TRADEMARK OFFICE
CERTIFICATE OF CORRECTION

PATENT NO. : 5,429,345

DATED : July 4, 1995

INVENTOR(S) : Tai-Her Yang

It is certified that error appears in the above-identified patent and that said Letters Patent is hereby corrected as shown below:

The preferred coordinate displacement drive shown in FIG. 1 may further be constructed as a linear displacement drive adjustment mechanism which utilizes two axial centers, the linear displacement drive being movable together with the foregoing two eccentric disc drives and further able to change the absolute position of the uppermost disc S301 relative to lower disc 302. The linear displacement drive shown in FIGS. 3 and 4 has the ability:

(1) to change the position of a workpiece or mechanism supported thereby by adjusting the axial distance between axial centers S1 and S2;

(2) to change the driving direction of disc 302 about axial center S2;

(3) to linearly displace axial centers S1 or S2 while at the same time rotating discs 301 and 302.

Signed and Sealed this

Thirtieth Day of January, 1996

*Attest:*

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,429,345

DATED : July 4, 1995

INVENTOR(S) : Tai-Her Yang

It is certified that error appears in the above-identified patent and that said Letters Patent is hereby corrected as shown below:

As shown in FIGS. 3 and 4, the first disc 301, for supporting a workpiece or serving as the bearing seat of another mechanism or machine body structure, can rotate about axial center S1, and is in turn supported by linear displacement mechanism 304, mechanism 304 being mounted under the base of axial center S1 within the second disc 302 for relative displacing axial centers S1 and S2, and including coupling guide rails, a guide slot or a dove-tail slot and dove-tail seat or guide lever and slide block, and having a guide worm, ball-roller worm, or other linear displacement driving device (not shown) for accepting manual or mechanical or electric power, or magnetic or fluid driving, in order to adjust the axial distance between S1 and S2 for independent displacement or driving together with rotation of the first disc, or driving together with rotation of the second disc, or driving in combination with rotation of both discs, so as to move the target point on the first disc for absolute positioning of the target.

The foregoing eccentric and linear displacement may use a manual, automatic analog, or automatic digital control system interface for use as a positioning drive in a cutting press, either for the cutting tool or for the workpiece to be cut.